(12) United States Patent
Cruz et al.

(10) Patent No.: US 8,483,277 B2
(45) Date of Patent: Jul. 9, 2013

(54) METHOD AND APPARATUS FOR MOTION COMPENSATED TEMPORAL FILTERING USING SPLIT UPDATE PROCESS

(75) Inventors: Diego Santa Cruz, Geneva (CH); Julien Reichel, Lausanne (CH); Francesco Ziliani, Lausanne (CH)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1864 days.

(21) Appl. No.: 11/182,890

(22) Filed: Jul. 15, 2005

(65) Prior Publication Data
US 2007/0014362 A1 Jan. 18, 2007

(51) Int. Cl.
*H04N 7/12* (2006.01)

(52) U.S. Cl.
USPC .............. 375/240.16; 375/240.24; 348/398.1; 348/402.1

(58) Field of Classification Search
USPC ................. 375/240.16, 240.24; 348/398.1, 348/402.1
See application file for complete search history.

(56) References Cited

U.S. PATENT DOCUMENTS

| | | | |
|---|---|---|---|
| 6,782,051 B2 | 8/2004 | Pesquet-Popescu | 375/240.11 |
| 2003/0026339 A1 | 2/2003 | Presquet-Popescu | 375/240.16 |
| 2003/0035478 A1 | 2/2003 | Taubman | 375/240.11 |
| 2003/0202598 A1 | 10/2003 | Turaga | 375/240.19 |
| 2003/0202599 A1 | 10/2003 | Turaga | 375/240.19 |
| 2004/0008785 A1 | 1/2004 | Turaga | 375/240.19 |
| 2004/0114689 A1 | 6/2004 | Zhang | 375/240.16 |
| 2004/0252230 A1* | 12/2004 | Winder | 348/402.1 |
| 2005/0117640 A1 | 6/2005 | Han | 375/240.03 |
| 2005/0226334 A1* | 10/2005 | Han | 375/240.16 |
| 2006/0072670 A1* | 4/2006 | Park et al. | 375/240.24 |
| 2006/0250520 A1* | 11/2006 | Han et al. | 348/398.1 |

OTHER PUBLICATIONS

Lin Luo, "Motion Compensated Lifting Wavelet and Its Application in Video Coding", IEEE ICME; 4 pages; Aug. 2001.

Bo Feng, et al., "Energy distributed update step (EDU) in lifting based motion compensated video coding," IEEE; 0-7803-8554-3/04; pp. 2267-2270; 2004.

G. Pau, B. Pesquet-Popescu, M. van der Schaar, J. Viéron, "Delay-performance Trade-offs in Motion-compensated Scalable Subband Video Compression", Proc. of Advanced Concepts for Intelligent Vision Systems (ACIVS), Brussels, Sep. 2004.

(Continued)

*Primary Examiner* — Sath V Perungavoor
*Assistant Examiner* — James Pontius
(74) *Attorney, Agent, or Firm* — MH2 Technology Law Group LLP

(57) ABSTRACT

A method for temporal decomposition and reconstruction of an input video signal is disclosed. The method uses a prediction process and an update process in the framework of motion compensated temporal filtering (MCTF), the motion information used for the update process being derived from the motion information used for the prediction process, and the method employing a block based video codec composed of an encoder and a decoder. In response to the update and prediction processes on a picture being based on N reference pictures where N is greater than one, the update process is split into N update processes using a single picture as a reference. Each one of the split update processes is executed each time a picture that is needed as a reference by the process is received.

16 Claims, 13 Drawing Sheets

OTHER PUBLICATIONS

Daubechies, Ingrid, et al., "Factoring Wavelet Transforms Into Lifting Steps," The Journal of Fourier Analysis and Applications, vol. 4, Issue 3, 1998, pp. 247-269.

Choi, Seung-Jong et al., "Motion-Compensated 3-D Subband Coding of Video," IEEE Transactions on Image Processing, vol. 8, No. 2, Feb. 1999, pp. 155-167.

Reichel, Julien, "Joint Scalable Video Model JSVM-2," Joint Video Team, JVT-O202, Apr. 2005, 31 pages, Busan, Korea.

Wiegand, Thomas, et al., "Overview of the H.264/AVC Video Coding Standard," IEEE Transactions on Circuits and Systems for Video Technology, vol. 13, No. 7, Jul. 2003, 19 pages.

Luo, Lin et al., "Motion Compensated Lifting Wavelet and Its Application in Video Coding," IEEE International Conference on Multimedia & Expo 2001, Aug. 2001, 4 pages.

\* cited by examiner

Lifting Scheme
(Analysis Filterbank)

Inverse Lifting Scheme
(Synthesis Filterbank)

Update Block 0

Predict Block 0

Update Block 1

Predict Block 1

FIG. 12A
FIG. 12B
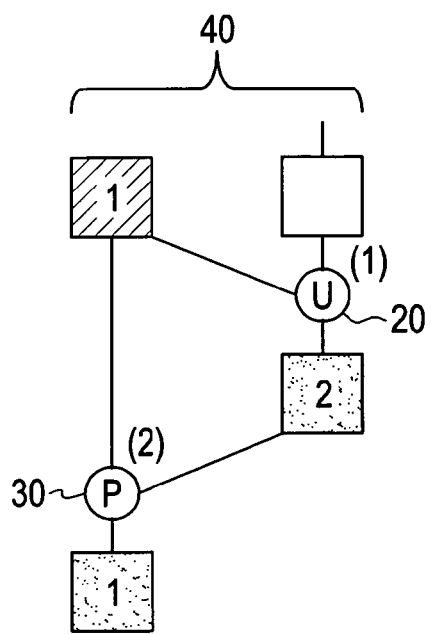
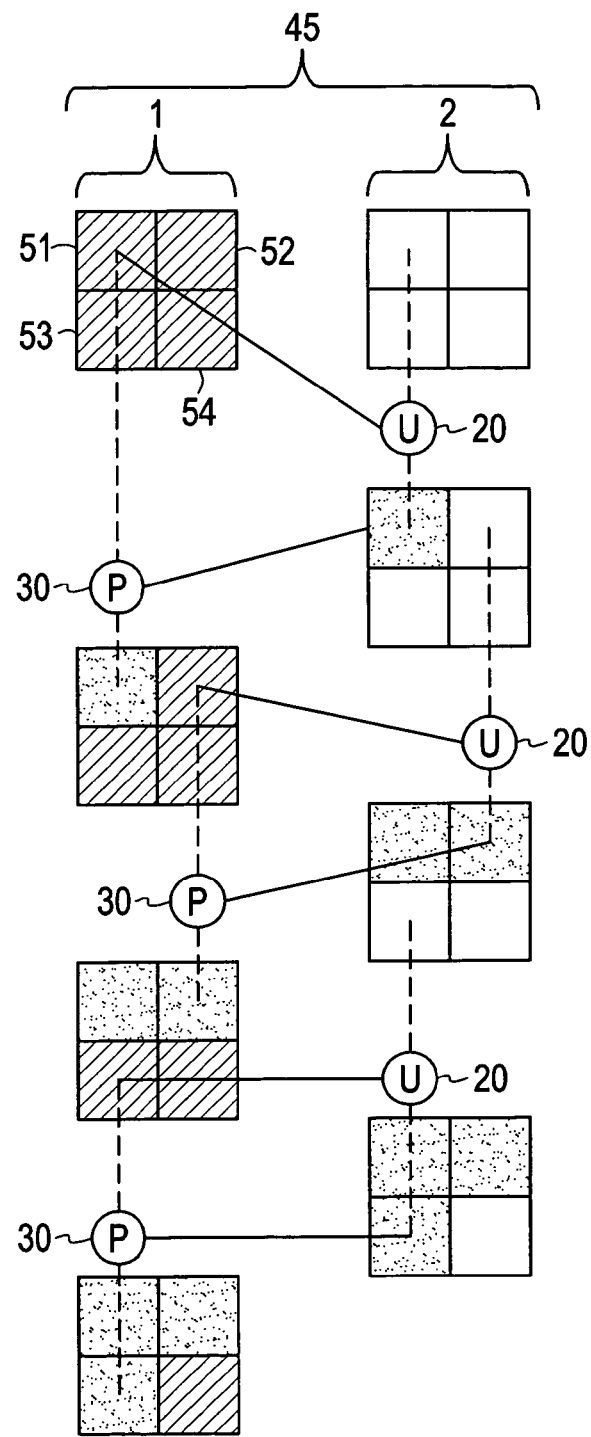

METHOD AND APPARATUS FOR MOTION COMPENSATED TEMPORAL FILTERING USING SPLIT UPDATE PROCESS

BACKGROUND OF THE INVENTION

The present disclosure relates generally to motion compensated temporal filtering (MCTF) for open loop scalable video coding, and particularly to MCTF employing prediction and update processes.

Motion Compensated Temporal Filtering (MCTF) has shown to be a very efficient tool for open loop scalable video coding as it enables open loop video coding that provides for quality scalability. The efficiency of MCTF in video coding has been recognized by standardization committees, such as MPEG (Motion Picture Experts Group). The MCTF process is separated into two sub-processes: an update process and a prediction process. Contrary to hybrid video coding, current implementations of the MCTF principle require the use of "residual buffers" in the motion compensation steps, as the picture must be updated before being used for the prediction process. As such, one of the drawbacks of the MCTF process is that additional decoding picture buffers (residual buffers that store the predicted pictures) are needed to store intermediate decoded pictures. Residual buffers introduce some practical problems as they require higher precision than those used for output pictures and updated pictures (that is, conventional picture buffers), placing higher memory demands and complicating buffer management in low-complexity implementations. A remedy to this problem is to remove totally the update process. However this introduces a penalty in compression efficiency and degrades the quality of the decoded video. Another remedy is to use two conventional picture buffers to store each residual picture, and modify the MCTF process to be able to split the residual information into these two buffers. Although this solution solves the problem of having two different types of buffers with differing precisions, it roughly doubles the amount of memory required to store residual pictures. Accordingly, there is a need in the art of MCTF that overcomes these drawbacks.

BRIEF DESCRIPTION OF THE INVENTION

An embodiment of the invention includes a method for temporal decomposition and reconstruction of an input video signal that uses a prediction process and an update process in the framework of motion compensated temporal filtering (MCTF), the motion information used for the update process being derived from the motion information used for the prediction process, and the method employing a block based video codec composed of an encoder and a decoder. In response to the update and prediction processes on a picture being based on N reference pictures where N is greater than one, the update process is split into N update processes using a single picture as a reference. Each one of the split update processes is executed each time a picture that is needed as a reference by the process is received.

Another embodiment of the invention includes a device for temporal decomposition and reconstruction of an input video signal that uses a prediction process and an update process in the framework of motion compensated temporal filtering (MCTF), the motion information used for the update process being derived from the motion information used for the prediction process, and the device employing a block based video codec comprising an encoder, a decoder, and a storage medium readable by a processing circuit. The storage medium stores instructions for execution by the processing circuit for executing an embodiment of the aforementioned method.

A further embodiment of the invention includes a device for temporal decomposition and reconstruction of an input video signal that uses a prediction process and an update process in the framework of motion compensated temporal filtering (MCTF), the motion information used for the update process being derived from the motion information used for the prediction process, and the device employing a block based video codec comprising an encoder and a decoder. The codec is configured to facilitate implementation of an embodiment of the aforementioned method.

BRIEF DESCRIPTION OF THE DRAWINGS

Referring to the exemplary drawings wherein like elements are numbered alike in the accompanying Figures:

FIG. 12 depicts an exemplary local update process in accordance with an embodiment of the invention;

DETAILED DESCRIPTION OF THE INVENTION

Embodiments of the invention take place in the framework of scalable video coding, and more exactly inside the MCTF process. An embodiment removes the need for additional residual buffers without substantially scarifying compression efficiency by dividing the update process into two parts: a split-update process, and a local update process.

The split-update process removes all inter-dependencies between the pictures during the update process, and thus removes all needs for residual picture buffers except the one used to decode the current picture. In general, an update process using N inputs is split into N update processes using 1 input. Each update process is executed immediately after a picture is received and is directly followed by the prediction process. Thus, the residual picture does not need to be stored for the decoding of other pictures.

The local update process removes the need for a last intermediate residual picture buffer by enabling a block-by-block execution of the update and prediction processes. In general, when the prediction of a block is necessary, the reference block (used for prediction) is updated on a block-by-block basis, and the updated block is directly used for prediction. Applying the local update process, it is not necessary to store a residual signal as the prediction may be directly performed on a block by block basis.

An embodiment of the invention may employ the split-update process by itself, or the split-update process in combination with the local update process. If only the split-update process is employed, then only one residual buffer is required as the decoding buffer. If the local update process is employed in combination with the split-update process, then no residual buffers are required.

MCTF Generally

Figure 1A:
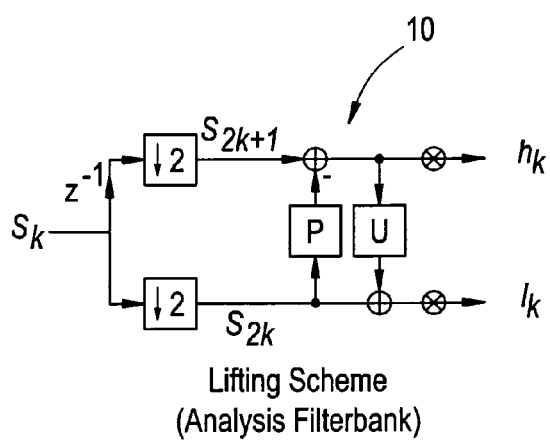
FIG. 1 depicts an exemplary lifting representation of an analysis-synthesis filter bank for use in accordance with an embodiment of the invention.
Figure 1B:
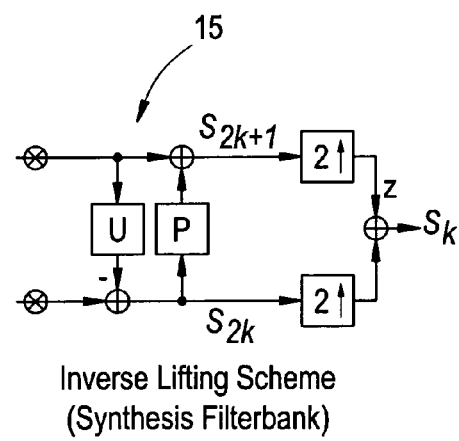

An embodiment of MCTF is based on the lifting scheme, which is described in available literature, such as: I. Daubechies and W. Sweldens, "Factoring wavelet transforms into lifting steps," J. Fourier Anal. Appl., 4(3):247-269, 1998, and S. -J. Choi and J. W. Woods, "Motion-compensated 3-D subband coding of video," IEEE Trans. Image Processing, vol. 3, no. 2, pp. 155-167, February 1999, for example. The lifting scheme insures perfect reconstruction of the input in the absence of quantization of the decomposed signal. This property is valid even if non-linear operations are used during the lifting operation (motion estimation and compensation). The generic lifting scheme consists of three types of operations: polyphase decomposition, prediction(s), and update(s). In most cases, MCTF is restricted to a special case of lifting scheme with only one prediction and one update step. FIG. 1 illustrates the lifting representation of an analysis-synthesis filter bank.

Referring now to FIG. 1, the analysis side (a) 10 illustrates that the polyphase decomposition splits the signal s in the even s[2k] and odd s[2k+1] signals. The odd samples s[2k+1] of a given signal s are predicted by a linear combination of the even samples s[2k] using a prediction operator P(s[2k]), and a high-pass signal h[k] is formed by the prediction residuals. A corresponding low-pass signal l[k] is obtained by adding a linear combination of the prediction residuals h[k] to the even samples s[2k] of the input signal s using an update operator U(h[k]). The high and low-pass signals are defined by Equation-1, where k represents the temporal position of the picture:

$$h[k] = s[2k+1] - P(s[2k]) \text{ with} \qquad \text{Eqs.-1}$$

$$P(s[2k]) = \sum_i p_i s[2(k+i)]$$

$$l[k] = s[2k] + U(h[k]) \text{ with } U(h[k]) = \sum_i u_i h[k+i]$$

At the synthesis side (b) 15, the same operations are executed, but in reverse order and with inverted signs, followed by a reconstruction process using the even and odd polyphase components. Here, the reconstructed signals are given by:

$$s[2k]=l[k]-U(h[k]) \qquad \text{Eqs.-2}$$

$$s[2k+1]=h[k]+P(s[2k])$$

Using s[x, k] to define a video signal with a spatial coordinate $x=(x,y)^T$ and the temporal coordinate k, the prediction and update operators for the temporal decomposition using the lifting representation of the Haar wavelet are given by:

$$P_{Haar}(s[x, 2k]) = s[x, 2k] \qquad \text{Eqs.-3}$$

$$U_{Haar}(h[x, k]) = \frac{1}{2}h[x, k]$$

As used herein, x is a vector that describes the position of a pixel in a picture, and k is the temporal position of the picture. Thus, for Equations 1 and 2, the [k], [2k] and [2k+1] operators may be viewed as being replaced with [x, k], [x, 2k] and [x, 2k+1] operators.

For the 5/3 transform, the prediction and update operators are given by:

$$P_{5/3}(s[x, 2k]) = \frac{1}{2}(s[x, 2k] + s[x, 2k + 2]) \qquad \text{Eqs.-4}$$

$$U_{5/3}(h[x, k]) = \frac{1}{4}(h[x, k] + h[x, k - 1])$$

An extension of the above lifting scheme to motion-compensated temporal filtering is realized by modifying the prediction and update operators as follows:

$$P_{Haar}(s[x, 2k]) = s[x + m_{P0}, 2k - 2r_{P0}] \qquad \text{Eqs.-5}$$

$$U_{Haar}(h[x, k]) = \frac{1}{2}h[x + m_{U0}, k + r_{U0}]$$

$$P_{5/3}(s[x, 2k]) =$$

$$\frac{1}{2}(s[x + m_{P0}, 2k - 2r_{P0}] + s[+m_{P1}, 2k + 2 + 2r_{P1}])$$

$$U_{5/3}(h[x, k]) = \frac{1}{4}(h[x + m_{U0}, k + r_{U0}] + h[+m_{U1}, k - 1 - r_{U1}])$$

In Equation-5, r is a reference index, m is a motion vector, and the "0" and "1" indices associated with the prediction and update indices indicate the index of the input reference of the MCTF process. In an exemplary embodiment, only two references are used, which is referred to as a 5/3 MCTF process. Reference indices r, where r≧0, allow for general frame-adaptive motion-compensated filtering. In an embodiment, the motion vectors m are not restricted to sample-accurate displacements. In case of sub-sample accurate motion vectors, the term s[x+m, k] has to be interpreted as a spatially interpolated value.

As can be seen from the above equations, both the prediction and update operators for the motion-compensated filtering using the lifting representation of the Haar wavelet are equivalent to uni-directional motion-compensated prediction. For the 5/3 wavelet, the prediction and update operators specify bi-directional motion-compensated prediction.

In the framework of block based video coding, such as in Scalable Video Coding (SVC) described in J. Reichel, H. Schwarz, M. Wien (ed.), "Joint Scalable Video Model JSVM-2," Joint Video Team, JVT-O202, Busan, Korea, April 2005, for example, the update and prediction process also include the notion of intra and inter blocks. Intra blocks are blocks of pixels that are not modified by blocks from other pictures, while inter blocks are. Accordingly, inter blocks are modified during the prediction and/or update process, while intra blocks are not. As such, the prediction and update processes are not applied to intra blocks.

Expanding on Equations 1-5, a generic inverse MCTF process may be described by the following set of equations:

$$s_{l-1}[x, 2^l k] := s_l[x, 2^l k] - \sum_{i=0}^{N_U-1} w_{U,i} s_l[x + m_{U,i}, 2^l k + 2^{l-1} + r_{U,i}] \quad \text{Eqs.-6}$$

for the update process, and $$s_{l-1}[x, 2^l k - 2^{l-1}] := \quad \text{Eqs.-7}$$
$$s_l[x, 2^l k - 2^{l-1}] + \sum_{j=0}^{N_P-1} w_{P,j} s_{l-1}[x + m_{P,j}, 2^l k + r_{P,j}]$$

for the prediction process.

Where:
x is the vector describing the position of the pixel in the picture;
k describes the temporal position of the picture;
l describes the current temporal level, l=1 . . . L, where L=log$_2$(GOP_size)
GOP refers to a group of pictures;
$s_l[x, 2^l k]$ describes the value of the pixel at spatial position x and at temporal position $2^l k$ for the level l. In the case where x does not correspond to an exact pixel position (that is, it corresponds to a sub-pixel because of the motion vector, for example), then $s_l[x, 2^l k]$ should be interpreted as an interpolated value. As used herein, $s_l[-, 2^l k]$ is referred to as the reference or input picture to the update or prediction process;
$N_P$ describes the number of inputs to the prediction process (in an embodiment, $N_P$=2);
$N_U$ describes the number of inputs to the update process (in an embodiment, $N_U$=$N_P$=2);
$m_{U,i}$ describes the motion vector displacement for the update process concerning the input i. It describes the relative position of the pixels used for the update process in the reference picture. $m_{U,i}$ may be different for each position x;
$m_{P,j}$ describes the motion vector displacement for the prediction process concerning the input j. It describes the relative position of the pixels used for the prediction process in the reference picture. $m_{P,j}$ may be different for each position x;
$r_{U,i}$ describes the temporal displacement for the update process concerning the input i. $r_{U,i}$ may be different for each position x;
$r_{P,j}$ describes the temporal displacement for the prediction process concerning the input j. $r_{P,j}$ may be different for each position x;
$w_{U,i}$ describes a weighting factor for the update process. $w_{U,i}$ may be different for each position x;
$w_{P,j}$ describes a weighting factor for the prediction process. $w_{P,j}$ can be different for each position x;
The operator x:=y signifies that the value of y is assigned to the variable x.

MCTF Levels

To process a video sequence, the MCTF scheme is applied using a recursive algorithm, thereby dividing the overall MCTF process into a series of processing levels (L). For each level, the prediction/update process is applied on all the input pictures. The outputs of the process are two set of pictures. The predicted (or high-pass) picture, represented by $h_k$ in FIG. 1, which are also called residual pictures, and the updated (or low-pass) picture, represented by $l_k$ in FIG. 1.

On the encoder side (analysis side (a) of FIG. 1), the first time (first level) the MCTF is executed, the input of the process is the original picture. The second time (second level) the MCTF is executed, the input of the process is the low-pass output of the previous level, that is, the $l_k$ pictures of the first level.

On the decoder side (synthesis side (b) of FIG. 1), the MCTF levels are executed in the reverse order. In this case, the outputs of a level are used as the low-pass picture input for the next reconstruction levels.

The levels are numbered from a decoder point of view, so the first MCTF level executed by the decoder is level 0, followed by level 1, and so on up to level N−1. According to this notation the encoder starts with level N−1 and finishes with level 0.

Encoding and Decoding

When coding a video sequence employing the aforementioned MCTF scheme, the concept of Group of Pictures (GOP) is generally introduced, which is used to control the delay and the amount of memory necessary to perform the MCTF process. Embodiments of the invention may use any one of three types of GOP: close GOP, open GOP and sliding GOP. The MCTF process is exactly the same inside the GOP, the main difference comes from the prediction and update process at the GOP boundary.

The close GOP structure has the advantage that each GOP may be processed in a complete independent manner from a previous GOP. However, its coding efficiency is reduced compared to the other structures because the pictures at the border of the GOP are not predicted as efficiently as the other pictures. The sliding GOP has a better coding efficiency as all pictures, regardless of their position in the GOP, go through the same type of prediction. However it introduces much larger delays and buffer requirements than the close GOP structure. The open GOP structure is a compromise between the two approaches, and is a popular choice between the three types. In open GOP, the decoded picture from the previous GOP may be used for the prediction process, but the previous GOP may not be updated anymore. In the following example illustrated in FIG. 3, the open GOP structure will be used as an example to illustrate the MCTF process, however the whole invention could be applied to any of the three structures.

Figure 3:
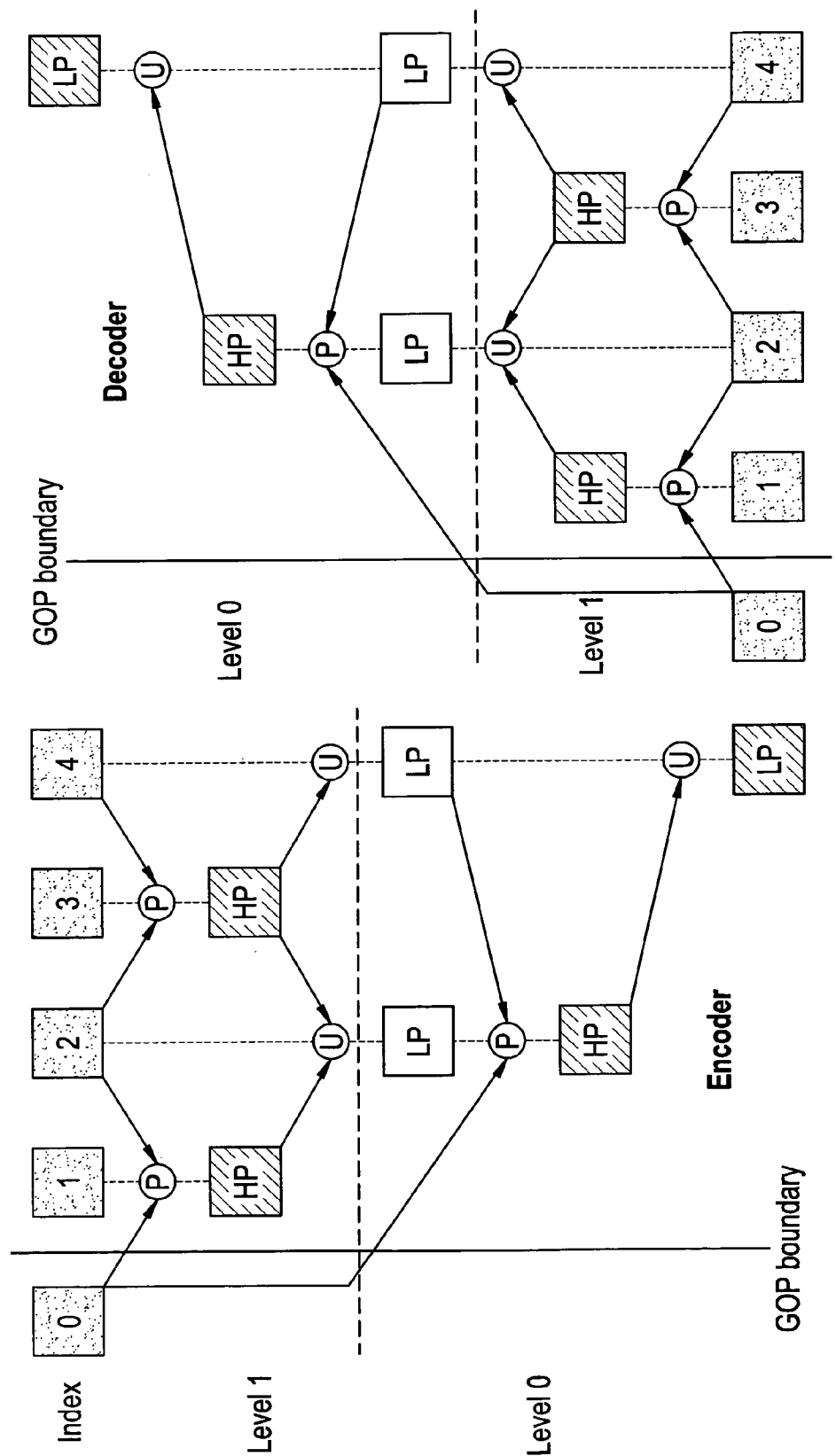
FIG. 3 depicts an exemplary process flow diagram representative of encoding and decoding processes for 5/3 MCTF using an open Group of Pictures (GOP) concept.

Referring now to FIG. 3, an example of the encoding and decoding processes for 5/3 MCTF using open GOP is depicted, where the scanning order between the encoder and the decoder are inverted. For simplification only the last picture (index 0) of the previous GOP is presented. In FIG. 3, the combination of one level of prediction and updates corresponds to the general lifting scheme illustrated in FIG. 1. Two levels of MCTF are illustrated both for the encoder and the decoder, which implies a GOP size of 4 pictures.

In FIG. 3, gray-shaded squares represent original pictures (with their index) on the encoder side, and reconstructed pictures on the decoder side. Cross-hatched squares represent the transmitted pictures. High-pass (residual) pictures are labeled HP, low-pass pictures as labeled LP. Predict and update processes are depicted by the circles labeled P and U, respectively.

During the first level of the MCTF encoding process, two prediction processes are executed on pictures 1 and 3, then two update processes are executed on picture 2 and 4. During the second level of the MCTF encoding process, picture 2 is predicted and picture 4 is updated.

It should be noted that in this example picture 0 is not updated, since it belongs to a previous GOP. On the decoder side, the MCTF levels are performed in the reverse order. That is, first picture 4 is updated and picture 2 is predicted. The same process is applied to the next level of MCTF.

It should also be noted that even if the same word (predict or update) is used for the encoder and decoder, the operations are actually different, which can be seen by referring back to FIG. 1. As illustrated by FIG. 1, when the encoder (analysis side (a)) executes the prediction process, it subtracts the reference from the current block, whereas the decoder (synthesis side (b)) adds the reference to the current block. The same principle is applied to the update process, which adds the predicted block to the reference block at the encoder, but subtracts it at the decoder.

Motion Compensation

In MCTF, both the update and predict processes need motion fields to perform motion compensation (MC). The predict and update motion fields are different as they compensate in inverse directions. Hence, one is inverted compared to the other. As MCTF is used in the framework of video coding, it is desirable to avoid the encoding of both motion fields. In order to do so, an update motion field is derived from the corresponding predict motion field by an inversion procedure specific to the coding method. Many such inversion procedures have been proposed, such as those described in J. Reichel, H. Schwarz, M. Wien (ed.), "Joint Scalable Video Model JSVM-2," Joint Video Team, JVT-O202, Busan, Korea, April 2005, for example, which may be applied to embodiments of the invention.

A task of the encoder is to produce the motion fields required for the MCTF process. This is done through a procedure known as motion estimation (ME), which finds the best motion field subject to the encoder's optimization criteria. As the update motion field is derived from the predict motion field, ME is applied only to find the predict motion field. When bi-directional predicts are used, as in the 5/3 MCTF, two motion fields are required per predicted picture. In the framework of block based video coding, ME finds the motion vector that minimizes the difference between the predicted and reference picture for each block.

In typical block based video codecs, such as H.264/AVC (as described in T. Wiegand, G. J. Sullivan, G. Bjøntegaard and A. Luthra, "Overview of the H.264/AVC Video Coding Standard," in *IEEE Trans. on Circuits and Video Technology*, vol. 13, no. 7, pp. 560-576, July 2003), MPEG standards (as described in T. Sikora, "MPEG digital video-coding standards," in *Signal Processing Magazine*, vol. 14, no. 5, pp. 82-100, September 1997), and SVC, a different prediction mode may be selected for each block. These modes may locally switch between unidirectional or bi-directional prediction (that is, Haar or 5/3 MCTF, respectively) or even employ intra prediction. An intra block is predicted from the samples in neighboring locations of the same picture, and thus is not subject to MCTF processing. In addition to specifying the prediction process, the block based video codec may also specify variations of the prediction process, such as explicitly coded or implicit motion vectors predicted from neighboring blocks (spatially and/or temporally), for example. The process by which the encoder selects the mode for each block is referred to as mode decision (MD). This process selects the best block mode, subject to the encoder's optimization criteria.

Execution of the MCTF Process

Conventionally the decoder uses a picture based approach for the inversion of the motion fields, and a GOP based approach for the execution of the whole MCTF process.

The overall description of conventional MCTF decoding corresponds generally to the following:

Decode all pictures of the GOP. For high-pass pictures, decode the texture and the motion information independently.

For each level of the MCTF transform, do the following:
Inverse the motion field used to predict the high pass picture of the current level
Execute the inverse update of the low-pass pictures
Execute the inverse prediction of the high-pass pictures It should be noted that this process implies the following: the motion information and the residual (high-pass) information must be stored during the decoding process; and, the inversion of the motion field and the update process requires the whole picture/motion field to be available before the processing can be started.

In an embodiment, the MCTF algorithm may be executed as follows:

receive and decode pictures $s_L[-,2^L k]$
for l=L to 1 do:
    for k=1 to GOP_size/$2^l$
    receive and decode all pictures $s_l[-, 2^l k - 2^{l-1}]$
    for k=1 to GOP_size/$2^l$
    for all pixels at position x of the picture at position $2^l k$
        execute the update process of equation (1)
    for k=1 to GOP_size/$2^l$
    for all pixels at position x of the picture at position $2^l k$
        execute the prediction process of equation (2)

In an embodiment, the aforementioned execution is "level" based.

There are, however, algorithms that are "picture" based, and execute the prediction and update processes on the picture. In this case the resulting values are the same, but the order of the operation is different. The generic expression of the picture based algorithm depends on which pictures are used in the summation of the prediction and update process.

A general principle of the picture based algorithm is the following:

Do, until all pictures $s_0[-, k]$ are available
receive a picture (which picture is to be received depends on the content of the Equations 6 and 7)
Step-1: For each available picture do:
if all the input of Equation-6 are available execute it
Step-2: For each available picture do:
if all the input of Equation-7 are available execute it
Got back to step 1, until no equations are executed.

Figure 2:
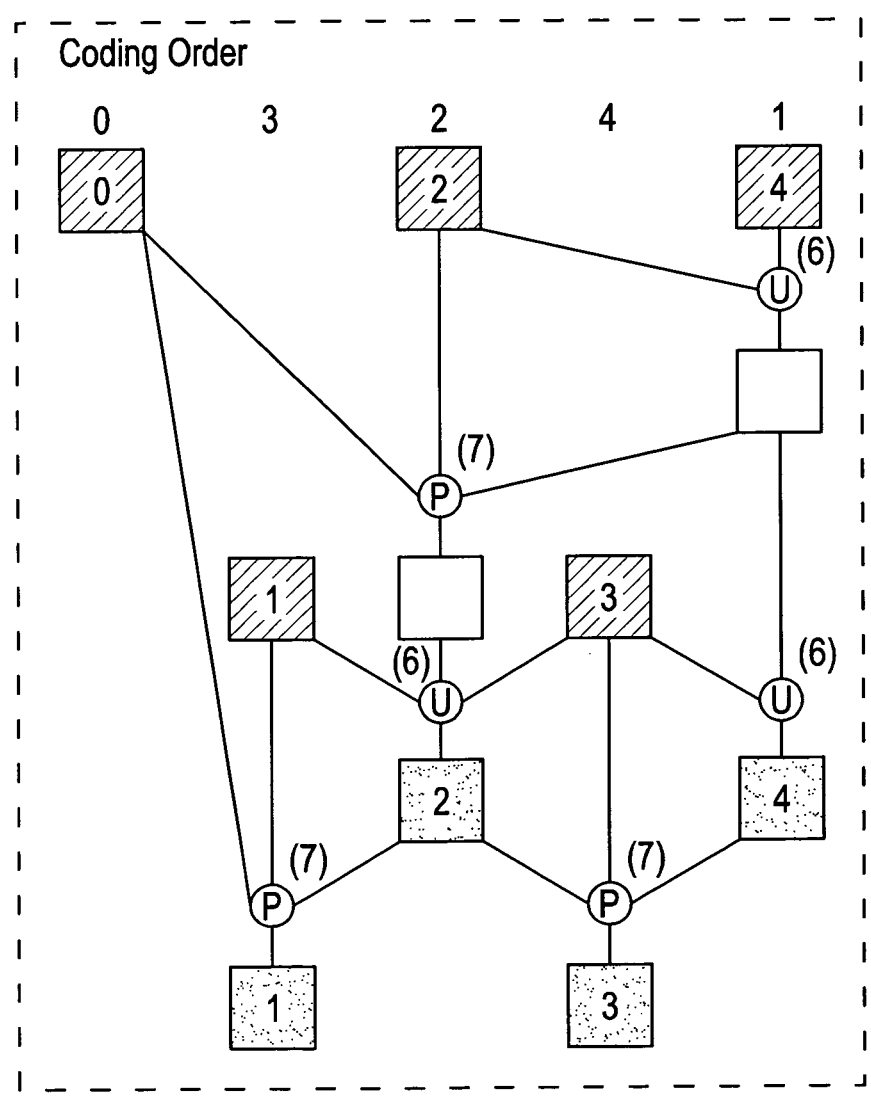
FIG. 2 depicts an exemplary process flow diagram representative of an algorithm for a MCTF process.

For example in the situation where the Equations 6 and 7 are reduced to using at most two pictures, the algorithm may be as depicted in FIG. 2. As used herein, a numbered box refers to a picture. In the MCTF process of FIG. 2, the cross-hatched squares represent a received picture, the number at the top of the figure represents the coding order, the numbers inside the squares represent the picture index, and the numbers in the parenthesis represents the above noted equation used in the process. In this process, the decoder operations are as follows:

Receive picture with index 4
Receive picture with index 2
Execute Equation-6 with l=2, k=1 for all pixels of the picture
Execute Equation-7 with l=2, k=1 for all pixels of the picture
Receive picture with index 1
Receive picture with index 3
Execute Equation-6 with l=1, k=1 for all pixels of the picture Execute Equation-7 with l=1, k=1 for all pixels of the picture Execute Equation-6 with l=1, k=2 for all pixels of the picture Execute Equation-7 with l=1, k=2 for all pixels of the picture In considering the whole decoding of a GOP, the decoder typically waits for multiple pictures to be received in order to execute the update process. For instance, and referring now to FIG. 4, which employs an inverse 5/3 MCTF process for a GOP of size eight, the decoding process may be described as follows:

The reconstructed picture 0 is available from the decoding of the previous GOP
Receive picture 4
Receive picture 8
Use picture 4 to update and modify picture 8
Use picture 8 and 0 to predict and modify picture 4
Receive picture 2
Receive picture 6
Use picture 2 and 6 to update and modify picture 4
Use picture 0 and 4 to predict and modify picture 2
Use picture 6 to update and modify picture 8
Use picture 4 and 8 to predict and modify picture 6
Receive picture 1
Receive picture 3
Use picture 1 and 3 to update and modify picture 2; the resulting picture 2 is the reconstructed picture 2
Use picture 2 and 0 to predict and modify picture 1; the resulting picture 1 is the reconstructed picture 1
Repeat the reconstruction process for pictures 3-8.

Figure 4:
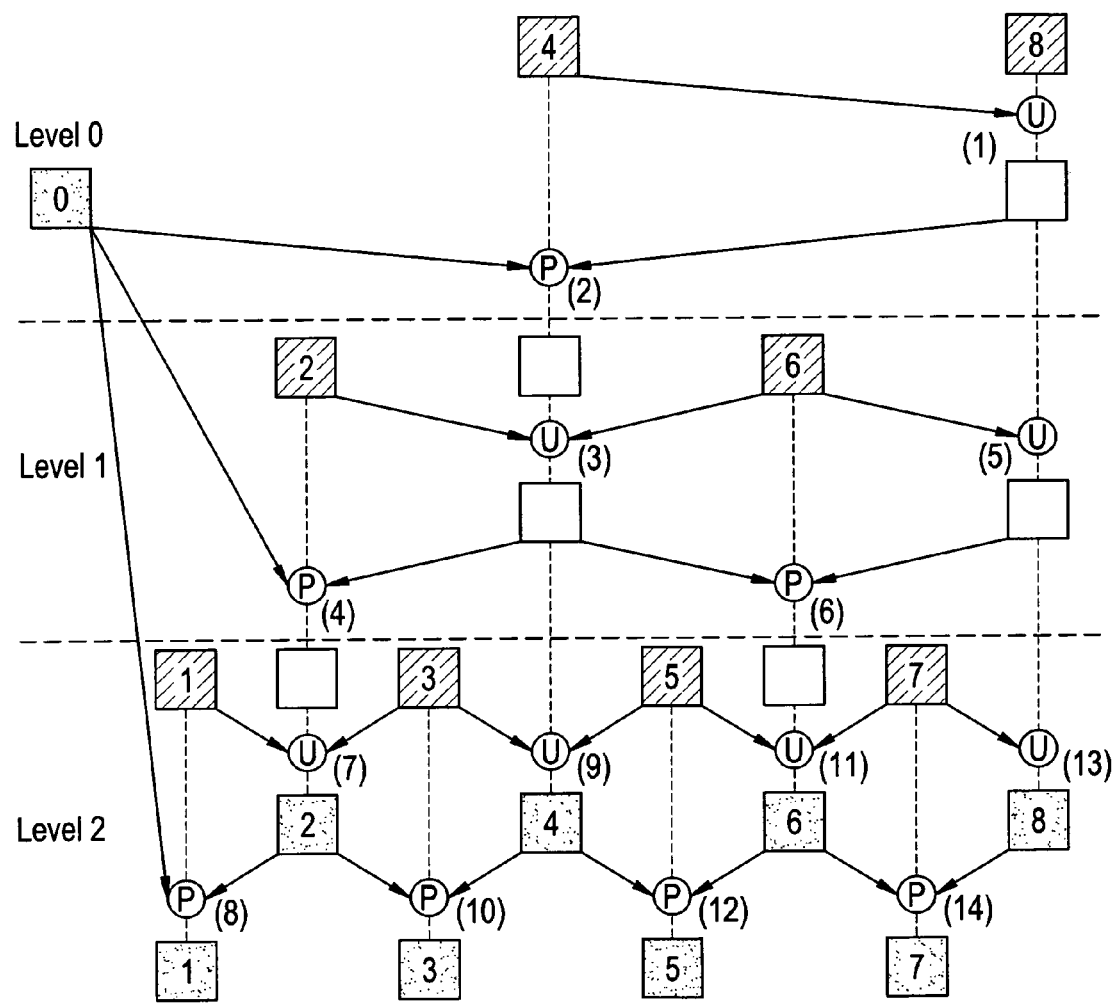
FIG. 4 depicts an exemplary process flow diagram representative of an inverse 5/3 MCTF process for a GOP of size eight.

In FIG. 4, cross-hatched squares represent received pictures, gray-shaded squares represent reconstructed pictures, the number inside a square represents the index of the picture, and the numbers between parentheses represent an example of the execution order of the update and prediction process. Depending on the interaction between the different pictures, it is possible to compute the MCTF inverse operations before all the pictures of the GOP have been received. For instance, when all pictures of a level have been received, then the inverse MCTF process for this level may be executed. Furthermore, it is not necessary to wait for all pictures of a level to be available before some part of the inverse MCTF process can be executed. An example of such processing is shown in FIG. 4, where picture 1 may be predicted immediately after picture 3 is received and 2 is updated. As such, it is not necessary to wait for all the pictures of the Level-2 (1, 3, 5 and 7) to be received before starting the processing.

From the above described reconstruction process, it can be seen that some of the pictures must be stored before they can be predicted or updated. For instance, picture 1 must be stored as a residual (high-pass) picture until picture 3 has been fully decoded and used to update and modify picture 2. As used herein, buffers used to store residual pictures, either because of the computation of the update process or because some pictures have not yet been received for the execution of the process itself, will be referred to as residual picture buffers, or residual buffers for short.

Problems Associated with Residual Buffers

The use of residual buffers for storing residual pictures has the following implications on the execution of the decoding process:

As the residual picture contains differential information, the residual picture buffers need to have a higher bit-depth than a conventional decoding buffer to avoid data loss. Typically, for an 8 bit video, the residual buffers should be at least 9 bits.

The execution of the update and prediction processes is not constrained by the receiving order. Thus, it is very possible that for some input, no update and prediction can be performed, whereas for other input, and depending on the structure of the MCTF, more than one update needs to be performed.

The fact that the residual picture must be stored, and the prediction is executed only when another (or even more than one) picture is received, additional delay is added to the decoding process.

The decoding process is executed on a picture basis, and not on a block basis.

The maximum number of possible residual buffers needs to be available to the decoder.

The aforementioned constraints on the decoding process may have some of the following impacts on the software and hardware implementation of the process:

The fact that the decoding is based on pictures and not on blocks may be a problem for devices with limited resources in terms of memory capacity and/or bandwidth.

The fact that the residual information needs to be stored in a buffer with higher bit-depth than conventional buffers may be a problem for all environments with limited memory resources.

The irregular execution of the update and prediction process means that either the decoder should be designed with a processing power capable of executing the process in the worst case scenario (over-dimensioning), or that an additional delay must be introduced during the decoding to flatten the processing power needs.

The additional delay introduced by the buffering may be a problem for all video systems requiring a low delay, like interaction with the scene or bi-directional communication for example.

Two types of buffers are necessary for the decoding process, which may double the amount of buffer memory necessary for the decoding process.

A solution proposed in the literature, such as that described in L. Luo, J. Li, S. Li, Z. Zhuang, and Y. -Q. Zhang, "Motion compensated lifting wavelet and its application in video coding," in *IEEE ICME*, pp. 365-368, 2001, for example, is to remove the update process entirely. While this solution may alleviate the above noted problems, it may also have adverse effects on the compression efficiency of the codec. Other solutions, such as that described in C. S. Lim, M. H. Lee, S. M. Shen, S. Kondo, "Scalable Video Coding—Proposal to reduce memory requirement for MCTF," Joint Video Team, JVT-0028, Busan, Korea, April, 2005, for example, proposes to distribute the residual picture information between two conventional picture buffers and modify the MCTF process to be able to split the residual picture between these two buffers. While this solution eases the buffer management as there is only one type of buffer, it still requires an increased amount of memory as two conventional buffers are required for each stored residual picture.

Split Update and Local Update

As previously discussed, an embodiment of the invention employs a split update and a local update process, which are directed toward removing the need to use residual picture buffers during the execution of the inverse MCTF process. To remove the residual picture buffers, two conditions are established: first, it must be possible to execute the prediction process on a picture as soon as it is received, that is, the prediction must be based on pictures that are either already updated or that will be updated only by the received picture; and second, it must be possible to compute the inversion of the motion field on a block basis, that is, there is no need to wait for the whole motion to be available before starting the inversion.

Employing the first condition removes all residual buffers except one, the one used to decode the current picture. This addresses problems linked to irregular processing power and problems related to a high number of residual buffers necessary for the decoding. Employing the first condition is made possible by using a split update process, which will be described in more detail below.

Employing the second condition also removes all residual buffers, and allows a block based decoding of the video. Employing the second condition is made possible by using a local update process, which will also be described in more detail below.

Split Update

As shown in FIG. 4, residual picture buffers are necessary in conventional MCTF process because in order to predict a picture, its reference picture must first be updated, and this update process is generally dependant on another picture other than the received picture. For instance, and with reference to FIG. 4, picture 3 is predicted (and modified) using picture 2 and 4. However, picture 4 must be updated by picture 3 and 5 before it can be used for the prediction. Thus, in conventional MCTF it is necessary to wait until picture 5 has been received before picture 3 can be predicted.

In a process that removes the residual picture buffers, such as an embodiment of the invention described herein, it is desirable for a prediction not to be delayed because of the update of a reference picture.

Figure 5:
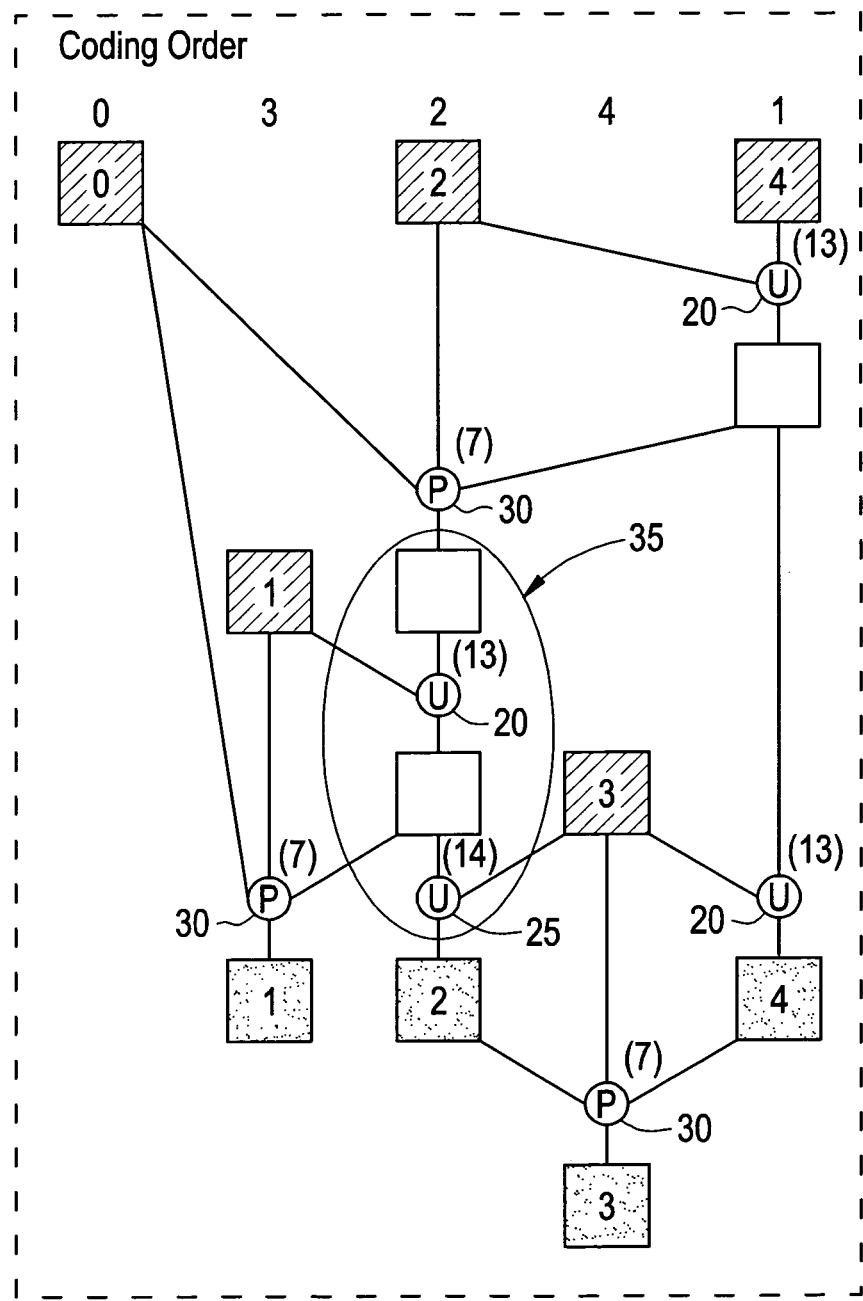
FIG. 5 depicts an exemplary process flow diagram representative of a split update process in accordance with an embodiment of the invention.

In order to remove the dependency on a future coded picture, an embodiment splits the update process into multiple updates, as depicted in the example of FIG. 5. The prediction process may then be executed immediately after the update and does not suffer from any delay. Thus, except for the decoding of the residual picture, no additional buffers are necessary for residual pictures.

In FIG. 5, the cross-hatched squares represent the received picture, the number at the top of the figure represents the coding order, the number inside each square represents the picture index, and the number in the parentheses represents the equation used in the process.

In FIG. 5, which illustrates the split update process using two sources, picture 2 is updated in two steps, first by picture 1, then by picture 3. More generally, however, if a picture is updated from N sources, the update process is split into N update processes, each from a single source. Thus, each time a residual picture (such as a reference picture used for updating) is received, it is first used to execute all the update process depending on it, and then it is directly predicted from the (partially) updated pictures.

The split of the update process may lead to an increase in complexity because the number of updates, and thus the motion compensation, is increased. However, in most common cases the update process uses two inputs, as depicted in FIG. 4. For a two-input update, the motion compensation is done for each input, and then the result of the two compensations are merged (using an averaging scheme for example) for the update process. In the absence of split update process, this scenario is illustrated by the following equations:

$$s_1[x, 2k] := s_0[x, 2k] - \frac{1}{4}(s_0[x+m_{U0}, 2k+1+r_{U0}] + s_0[x+m_{U1}, 2k-1-r_{U1}]) \quad \text{Eq.-8}$$

for the update process, and $$s_1[x, 2k-1] := s_0[x, 2k-1] + \frac{1}{2}(s_1[x+m_{P0}, 2k-2-r_{P0}] + s_1[x+m_{P1}, 2k+r_{P1}]) \quad \text{Eq.-9}$$

for the prediction process.

When employing a split update process, the equations are modified as follows:

$$s_1[x, 2k] := s_0[x, 2k] - \frac{1}{4}(s_0[x+m_{U1}, 2k-1-r_{U1}]) \quad \text{Eq.-10}$$

$$s_1[x, 2k-2] := s_1[x, 2k-2] - \frac{1}{4}(s_0[x+m_{U1}, 2k-1+r_{U0}]) \quad \text{Eq.-11}$$

for the update process, which now employs two equations, hence the "split" update, and $$s_1[x, 2k-1] := s_0[x, 2k-1] + \frac{1}{2}(s_1[x+m_{P0}, 2k-2-r_{P0}] + s_1[x+m_{P1}, 2k+r_{P1}]) \quad \text{Eq.-12}$$

for the prediction process.

It can be observed from the above equations that as long as some constraints are respected concerning $r_{U0}$, the number of motion compensations is the same as the conventional update process, the only difference being that the averaging is done in two steps instead of one.

In more general terms for a picture that is updated from N sources, Equations 10 and 11 are replaced by $N_U$ equations, with i=1 . . . $N_U$–1, according to the following:

$$s_{l-1}[x, 2^l k] := s_l[x, 2^l k] - w_0 s_l[x+m_{U,0}, 2^l k + 2^{l-1} + r_{U,0}] \quad \text{Eq.-13}$$

$$s_{l-1}[x, 2^l k] := s_{l-1}[x, 2^l k] - w_{U,i} s_l[x+m_{U,i}, 2^l k + 2^{l-1} + r_{U,i}] \quad \text{Eq.-14}$$

where Equation-13 is the first equation, and Equation-14 is the i-th equation.

It can be observed from the above equations that the number of motion compensations is the same as the conventional update process, the only difference being that the summation in Equation-6 has been replaced by a set of equations (Equation-13 to Equation-14).

In order to reduce the decoding complexity, the decoder could choose not to execute all of the N update processes, even if all the update processes where executed by the encoder.

For the split update process having two inputs, and with reference to FIG. 5, care should be exercised regarding the order of execution of the MCTF process, and the picture prediction orders should be inverted between the encoder and the decoder.

For example, at the encoder the operations are performed in the following order:

The picture 3 is predicted by picture 2 and 4
The picture 3 is used to update picture 2 and 4
The picture 1 is predicted from picture 0 and updated picture 2.
The picture 1 is used to update picture 2 once more.
Picture 2 is predicted by picture 0 and updated picture 4
Picture 2 is used to update picture 4 once more.
Picture 4 is encoded
Picture 2 is encoded
Picture 1 is encoded
Picture 3 is encoded At the decoder, the order is reversed as follows:
Picture 0, 4, 2 are received
Picture 2 is used to update picture 4
Picture 2 is predicted from picture 0 and 4

Picture 1 is received

The picture 1 is used to update picture 2

The picture 1 is predicted from picture 0 and picture 2

Picture 3 is received

The picture 3 is used to update pictures 2 and 4

The picture 3 is finally predicted by pictures 2 and 4.

Thus, at the encoder the motion related operations are executed in the reverse order compared to the coding order. The temporal processing order is important only if a picture is updated twice, if this is not the case, the same processing order may be used at the encoder and the decoder.

For the split update process having N inputs, and with reference still to FIG. 5, the generic decoding of a GOP may be simplified as follows:

1. receive and decode pictures $s_L[-, 2^L k]$
2. for l=L to 1 do:

for k=1 to GOP_size/$2^l$ receive and decode pictures $s_l[-, 2^l k - 2^{l-1}]$ for k'=1 to GOP_size/$2^l$ if $2^l k' + 2^{l-1} + r_{U,i}$ is equal to $2^l k - 2^{l-1}$ for any i execute equation (3.i) for the picture k', i.e. $s_{l-1}[x, 2^l k'] := s_{l-1}[x, 2^l k'] - w_{U,i} s_l[x + m_{U,i}, 2^l k + 2^{l-1}]$ for all pixels at position x of the picture at position $2^l k$, execute the prediction process of Equation-7

It should be noted that this execution is "level" based, and that Equation-7 is executed for each input picture.

The picture based decoding may also be simplified. For example, in the situation where Equations-7 and 14 are reduced to using at most two pictures, the algorithm is as depicted in FIG. 2. In this situation, the decoder operations are as follows:

Receive picture with index 4

Receive picture with index 2

Execute Equation-13 with l=2, k=1 for all pixels of the picture

Execute Equation-7 with l=2, k=1 for all pixels of the picture

Receive picture with index 1

Execute Equation-13 with l=1, k=1 for all pixels of the picture

Execute Equation-7 with l=1, k=1 for all pixels of the picture

Receive picture with index 3

Execute Equation-14 with l=1, k=1 for all pixels of the picture

Execute Equation-13 with l=1, k=2 for all pixels of the picture

Execute Equation-7 with l=1, k=2 for all pixels of the picture.

The split update process will now be described graphically with reference specifically to FIG. 5, which illustrates the update (circled U) 20, 25 and prediction (circled P) 30 processes being based on N (in this case two) reference pictures. For example, the prediction 30 of picture 2 is based on reference pictures 0 and 4.

As illustrated by the two update processes 20 and 25 depicted in region 35, the update process as applied to picture 2 is split into two update processes 20, 25, where each update process uses a single reference picture as an input picture. For example, update process 20 uses picture 1 as an input picture, and update process 25 uses picture 3 as an input picture. Each update process is executed on previously received picture using as reference the last received picture immediately after each input picture is received. It should be noted that some input pictures may trigger more than one update process, as it is the case with picture 3, which is used as input to the update process 25 (on picture 2) and the update process 20 (on picture 4).

The constraint the each update process 20, 25 involves a single reference picture means that execution of each update process 20, 25 uses the respective reference picture 1, 3 absent the inclusion of any other reference picture.

The execution order of the split update processes are as follows: first, execute all update processes using the last received picture as a reference, then execute a single prediction process on the last received picture. Subsequent to the execution of update processes 20, 25 using the last received picture as a reference a prediction process 30 is executed on the last received picture. For example, following update process 20 on picture 2 using reference picture 1, prediction process 30 is executed on picture 1 using picture 2 as reference, and following update process 25 on picture 2 using reference picture 3 and update process 20 on picture 4 using the same reference picture 3, a prediction process 30 is executed on picture 3.

Where N split update processes are involved on a picture, a decoder may choose to execute only the first n<N split updates in order to reduce its complexity. For example, the split update process involves a first update process 20 and a second update process 25, the second update process 25 is not necessarily executed by the decoder following the execution of the first update process 20, thereby reducing decoder complexity.

In FIG. 5, pictures 1, 2, 3 and 4 may be viewed as a plurality of received pictures from a video signal, with each picture being identifiable by its consecutively numbered index number 1, 2, 3 and 4. In an embodiment, only one of the update processes 20, 25 will be executed, with the order of execution depending on the index number of the reference picture being used as an input to the updating of the received subject picture. In an embodiment, the update process corresponding to the reference picture having an index number closest to the received picture to be updated is executed. For example, update process 20 uses reference picture 1, which has an index number 1 that is only one number removed from the index number of picture 2 (the picture to be updated). Hence, update process 20 would be considered closer to picture 2 than any other update process using a higher index reference number, and would therefore be the only one executed.

However, as can be seen in FIG. 5, both update processes 20 and 25 use reference pictures 1 and 3, respectively, that are only one number removed for the index number of picture 2. In such a situation, only the update process using the lowest index reference picture will be executed.

In an embodiment where the number n of split updates executed is equal to 0, referred to as a degenerated case of the split update, the decoder does not execute any update processes even if the update process was done at the encoder side.

Local Update

Computation of the conventional update process requires a residual buffer to decode the current picture. In addition, the motion information (or motion field) must also be stored for computation of the update motion field. This implies that the decoding process should be based on a picture basis and not on a block basis.

Figure 6:
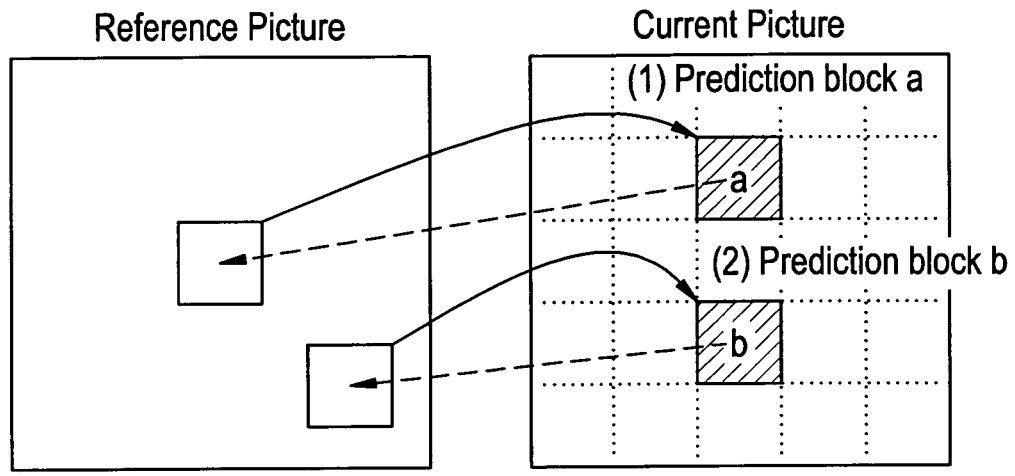
FIG. 6 depicts an exemplary prediction process using block-by-block decoding.

If the conventional prediction process is used (not MCTF process), it is possible to execute all of the decoding processes on a block by block basis. An example of such decoding is shown in FIG. 6. When a block is decoded, the block(s) in the reference picture designed by the motion vector(s) (as illustrated by the dashed lines in FIG. 6) are motion compensated and added to the residual block (as illustrated by the solid curved line in FIG. 6). The result corresponds to the reconstructed values, and no additional processing of the data is needed.

If the MCTF process is used, the residual blocks must be stored in a picture buffer together with the motion information. When all of the residual blocks of a picture have been received, the motion may be inverted, and the residual picture may be used in the update process. Only after the update process has been completed can the reference picture information be added (with motion compensation) to the residual picture to get the reconstructed values.

Buffering of the residual picture is needed for the following reasons:

1. the updated reference picture must be used for the prediction, but a reference block may be updated by any block in the current picture. Thus, it is necessary to wait for all the blocks of the current picture to be processed before being sure that the reference picture has been completely updated; and 2. the inversion of the motion needs the motion coming from all of the blocks to compute the inversion of the motion field.

In order to remove the need for the residual picture buffer, such as disclosed herein with reference to an embodiment of the invention, it is desirable to be able to compute the inversion of the motion and the update process on a block basis. In the following, it is assumed that the update/prediction processes are based only on two pictures (the reference picture and the current picture). However, this is for exemplary purposes only and embodiments of the invention are not so limited.

The need for an inversion of the motion field is removed by assuming that the predictive motion vector is directly inverted for the computation of the update process.

The picture based update and prediction processes may be merged into a single process, which may be executed as follows:

For each block in the scanning order:
    Decode the motion and texture information for the processing block
    Find the block(s) used in the temporal reference(s)
    Update the reference block (using the conventional update process)
    Predict the current block using the updated reference(s)

Figure 7:
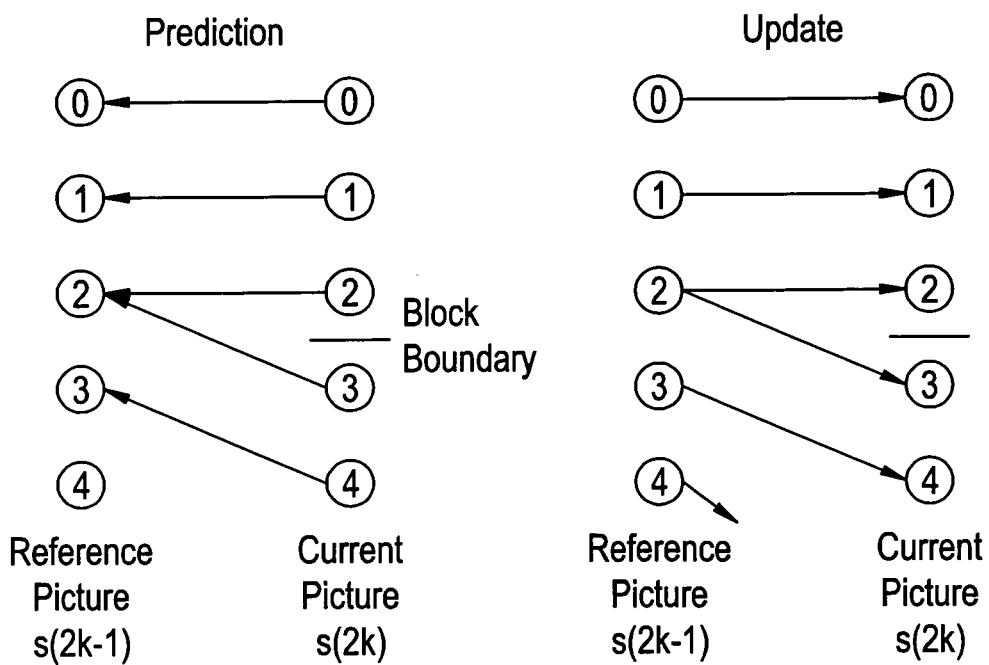
FIGS. 7-11 depict exemplary update and prediction processes with motion inversion.
Figure 8A:
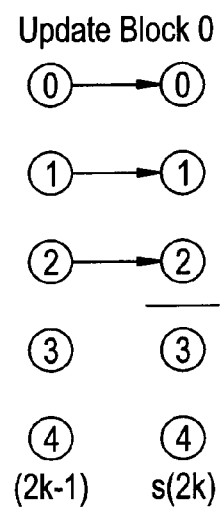
Figure 8B:
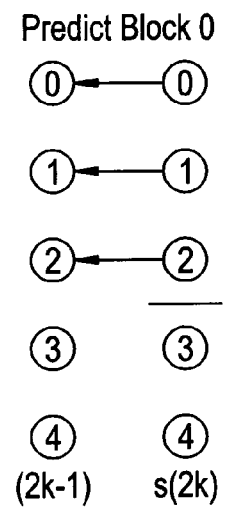
Figure 8C:
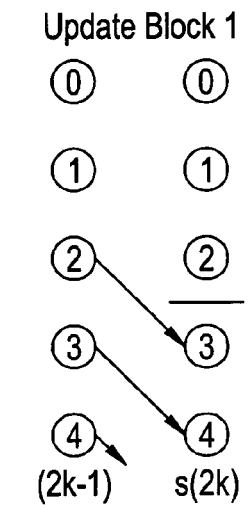
Figure 8D:
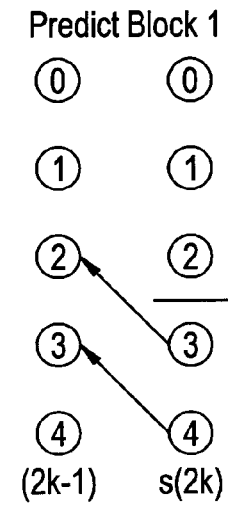

As a consequence, a pixel may be updated a multiple number of times from different sources. An example of such inversion is shown in FIG. 7, where the reference pixel 2 is updated both by the current pixel 2 and 3. As used herein, a numbered circle refers to a pixel.

The update and prediction process for the example of FIG. 7 are executed on a block basis. Using the example of execution shown in FIG. 8, it can be observed that the reference pixel 2 used for the prediction of the current pixel 2 is not the same as the one used for the prediction of pixel 3.

The prediction process of FIG. 8 is closely related to the Energy Distributed Update (EDU) process, which is described in Bo Feng, et al., "Energy distributed update step (EDU) in lifting based motion compensated video coding," ICIP '04, October 2004. In fact, if there is no overlapping between the blocks, the process of FIG. 8 corresponds to the EDU process. In situations having overlapped prediction, the results of the two algorithms differ as the EDU needs global knowledge of all of the motion before computing the update process.

Figure 9:
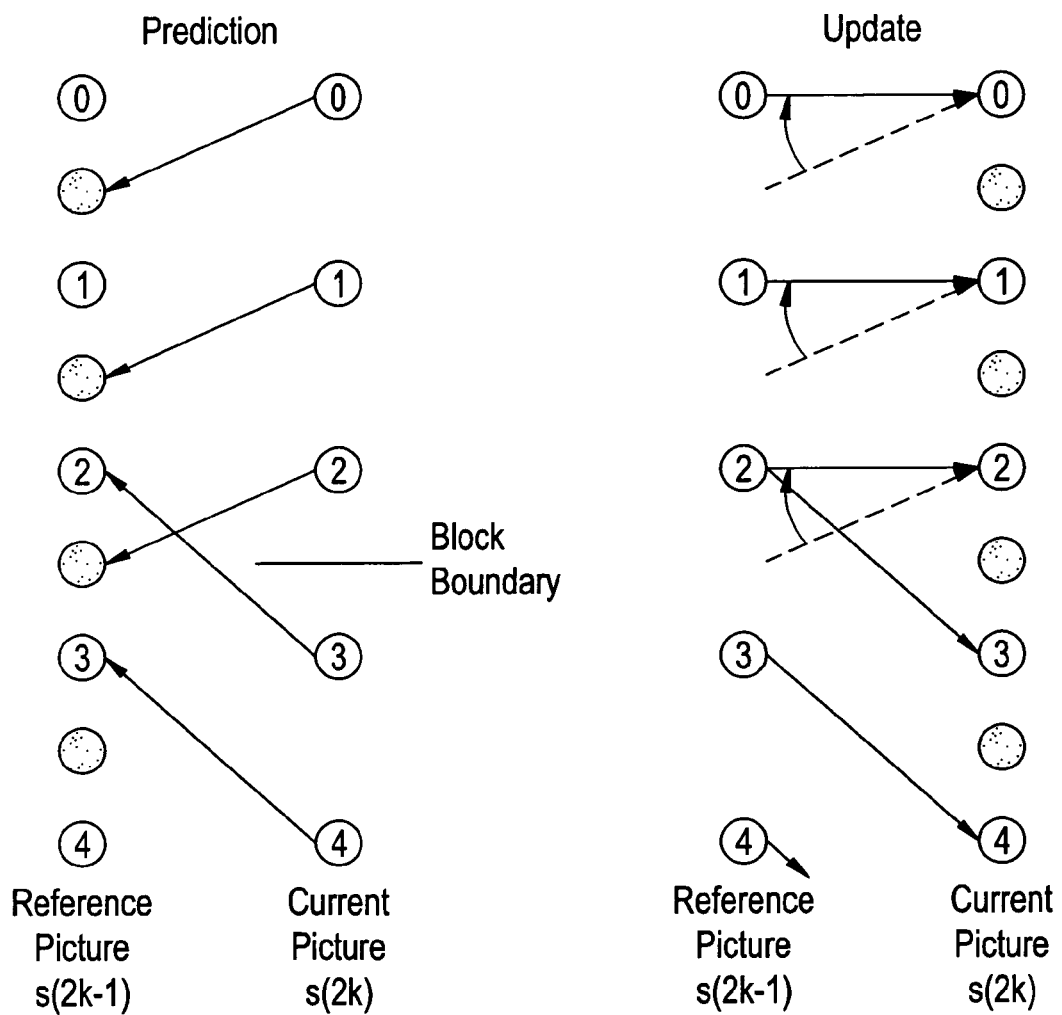
Figure 10:
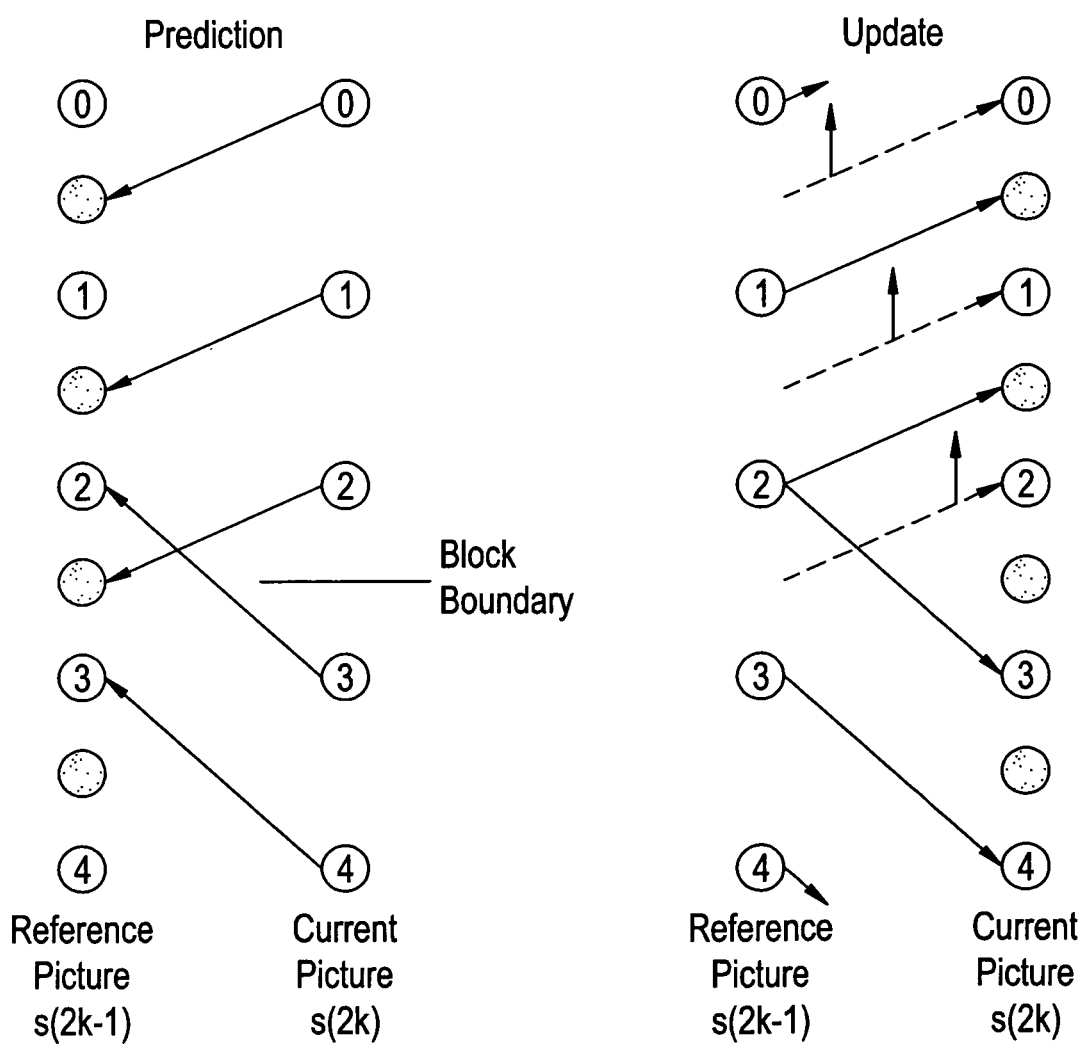
Figure 11:
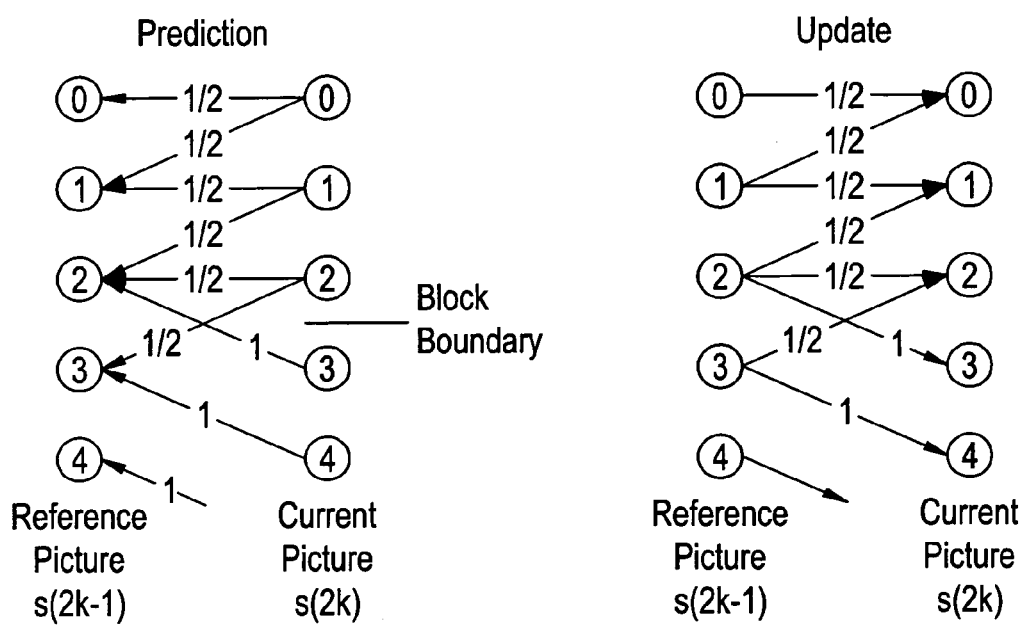

In situations having sub-pixel accuracy for the prediction process, the derivation of the motion for the update may be performed using full pixel accuracy approximation, a direct inversion of the motion vector with shift, or a scheme based on the EDU, which are depicted in FIGS. 9, 10 and 11 respectively.

Let $MV_P(x)$ be the motion vector displacement for a pixel in a current picture at position x for the prediction process. Let y be the position of the pixel in the reference picture, where $y=\text{floor}(x+MV_P(x))$. Let $MV_U(y)$ be the inverted motion field for the reference pixel at position y.

Then, for integer pixel accuracy inversion, the inverted motion of the block may be expressed as follows:

$$MV_U(y) = -\text{floor}(MV_P(x)).$$

And, for direct inversion of the motion vector with shift, the inverted motion of the block may be expressed as follows:

$$MV_U(y) = -MV_P(x).$$

In both situations, the update and prediction process for one block corresponds to the following pseudo code:

For each pixel at position x in the current block do:
    Compute the position of the reference pixel $y=\text{floor}(x+MV_P(X))$
    Compute the update motion $MV_U(y)$
    Update the pixel at position y using $MV_U(y)$
For each pixel at position x in the current block do:
    Predict pixel at position x using $MV_P(x)$.

Using the EDU scheme, the processes are slightly different. Let the decoder prediction process for the pixel s[x, 2k−1] of the current block B be expressed as:

$$s[x, 2k+1] := s[x, 2k+1] + \alpha\left(\sum_y w_{x,y} s[y, 2k]\right) \qquad \text{Eq.-15}$$

where $w_{x,y}$ describes the weight of pixel at position y in the reference picture. If integer pixel displacement is used, then $w_{x,y}$ is equal to zero for all position y, except the one described by the motion vector $MV_P(x)$. If sub-pixel accuracy is used, then the weights $w_{x,y}$ correspond to the interpolating filter used to compute the fractional pixel. For instance, in the situation of bi-linear interpolation, a maximum of 4 $w_{x,y}$ will be non-zero.

In this situation, the update process is directly derived from the above equation as $$s[y, 2k] := s[y, 2k] - \beta\left(\sum_{x \in B} w_{x,y} s[y, 2k+1]\right), \qquad \text{Eq.-16}$$

that is, the exact same weights are used for the update process. As the process is executed independently for each block, $w_{x,y}$ is equal to zero for all positions x not inside the current block.

In an embodiment, the local update may be viewed as an extension of the split update applied to a block structure, or even to a pixel structure of a codec. For the local update process, the update equations are further divided into sub equations inside a picture.

A condition in applying this algorithm is that the update equation takes only a single input for the second part of the equation, which is the case for all equations under Equation-14 with i=1 . . . $N_U$−1.

The decoding algorithm becomes:
receive and decode pictures $s_L[-, 2^L k]$
for l=L to 1 do:
   for k=1 to GOP_size/$2^l$
      For each pixel at position x being part of block B receive and decode pixels $s_l[x, 2^l k - 2^{l-1}]$
      for k'=1 to GOP_size/$2^l$
         if $2^l k' + 2^{l-1} + r_{U,i}$ is equal to $2^l k - 2^{l-1}$ and $F(x' + m_{U,i}, x) = 1$ for any i execute Equation-14 for the picture k' and for the pixel x', that is, $$s_{l-1}[x', 2^l k'] := s_{l-1}[x', 2^l k'] - w_{U,i} s_l[x' + m_{U,i}, 2^l k + 2^{l-1}]$$

for each pixel at position x of the picture at position $2^l k$ execute the prediction process of Equation-7
where F(a,b) is a function return equal to 1 if the position a and b have a connection during the update process, where the term "connection" is dependent upon the algorithm used for the inversion of the motion information and the interpolation process.

An example of the aforementioned process for one of the update/predict processes is depicted in FIG. 12, where the motion vector is neglected for simplification. The local update process will now be described graphically with reference specifically to FIG. 12, which illustrates on side (a) 40, update (circled U) 20 and prediction (circled P) 30 processes identical to those depicted in FIG. 5, and illustrates on side (b) 45, a zoom of the update and prediction processes using a local update process. In this example, the pixel displacements are assumed to be zero for purposes of simplified illustration, and each picture is divided into only four blocks 51, 52, 53 and 54. However, embodiments of the invention are not limited to these constraints.

In general, the conventional update process may be viewed as update process 20 using Equation-13, which is applied to blocks 51, 52, 53 and 54 of picture 2. Then the prediction process 30 is applied to the blocks 51, 52, 53 and 54 of the picture 1.

For the local update process, the update process 20 is local to a set of blocks. Accordingly, a local update process is applied to a set of update and prediction processes that are executed on a block basis. As depicted in FIG. 12, a reference block 51 of picture 2 is updated using a current block 51 of picture 1, and the current block 51 of picture 1 is predicted using the updated reference block 51 of picture 2. Blocks 52, 53 and 54 of reference picture 2 and current picture 1 are updated and predicted in a similar manner.

In the block based update and prediction processes of FIG. 12, where sub-pixel accuracy is used for the prediction of a block, common features are shared with the picture based update and prediction processes discussed earlier with reference to FIG. 5. For example: the updating of a pixel within a block may be executed only for the first time that the pixel is used when two blocks use the same pixel of the prediction process; and, the current block is used to update all pixels of the reference block that have not yet been updated, and the updated reference block is used to predict the current block. A block, such as 51, 52, 53 and 54 for example, may be further segmented into sub-blocks of pixels having a size from 2×2 pixels to the full size of the block used for motion prediction. Here, a similar parallel exists between the update/predict processes applied to the sub-blocks as is applied to the aforementioned pictures and blocks. For example: a sub-block of pixels may be updated only by a single reference sub-block, and in response to two blocks using the same sub-block of pixels for the prediction process, the sub-block of pixels may be updated only the first time they are used; and, the current block is used to update all pixels of the reference block not belonging to a sub-block having already been updated, and the updated reference block is used to predict the current block.

Where sub-pixel accuracy for the prediction of a block is employed, the motion vector, similar to that discussed previously in reference to FIG. 6, is rounded to the next full pixel precision for the computation of the update process, and is shifted to be aligned on a pixel of the updated block.

Considerations for Alternative Embodiments

Block Processing Order

Figure 13:
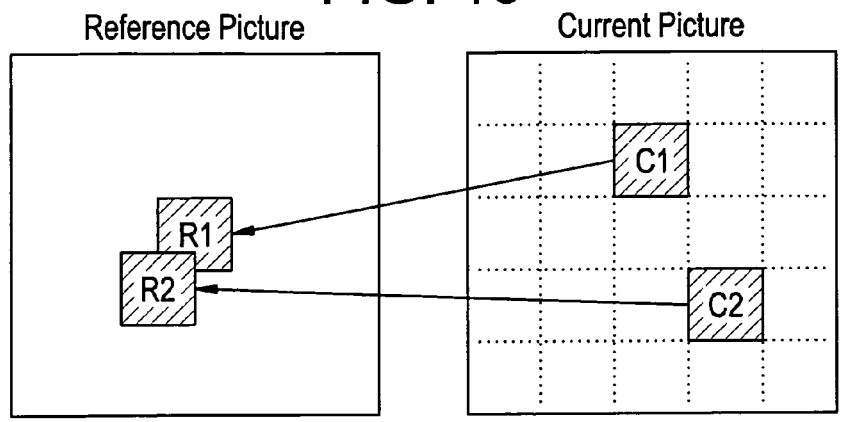
FIG. 13 depicts an exemplary motion field with overlapped reference blocks.

A problem that may arise when there is overlap in the prediction motion field is that more than one block in the original picture may use the same block, or part of it, in the reference picture. An example of such case is illustrated in FIG. 13. In this situation, block C1 and C2 have references R1 and R2 that are overlapping. However, as the block R1 will be updated during the prediction of C1, when the block C2 is to be decoded, part of the information in R2 will already have been modified. As such, the overlapped region will be updated twice.

Although a region may be updated twice, this is not a problem in itself. Due to the structure of the MCTF, both the encoder and the decoder use the same strategy for the update process, thus the transform is still reversible if the operations are performed in the reverse order at the decoder compared to how they were done at the encoder.

Since the update process may be interpreted as a computation of an average between a current picture and a reference picture, the updated block may be interpreted as an average between the block of the current picture and the block of the reference picture. A region in the reference picture being updated twice is then simply the average between two times the reference picture and each one of the regions in the current picture. Thus, as long as the energy of the residual picture used for update is not too large, multiple updates of some regions will not be of concern with respect to system performance.

However, in order to avoid a difference between the picture used in the encoder and the one used in the decoder, the scanning order of the block is of importance. A purpose of an in-place update process is to reduce the memory needed during the decoding process. Thus, the encoder to uses a reverse scan order for execution of the prediction and update processes.

As such, the encoding process becomes:
Scan the blocks in the reverse scan order, and for each block:
   Do the prediction process for the block
   Do the update process for the block
Scan the blocks in the normal scan order and for each block:
   Do the encoding of the block.

In order to avoid a mismatch between the encoder and the decoder, the encoder uses the updated reference for the prediction of each block. Thus, in the example of FIG. 13, the encoder will do the following operations:
Predict the block C2 using the original block R2
Update the whole block R2 using C2
Predict the block C1 using the partially updated block R1
Update the whole block R1 using C1.
The decoder will do the same operations, but in the reverse order, that is:
Update the whole block R1 using C1
Predict the block C1 using the partially updated block R1
Update the whole block R2 using C2.
Predict the block C2 using the original block R2.

Limiting the Impact of the Update Process

A purpose of the update process is to distribute the compression noise across the encoded picture to control the drift. In view of this purpose, it is desirable not to use large residual values during the update process. To prevent this from happening, a threshold or a weighting function may be applied to the residual data before using it for the update process. This may be more significant in situations involving an in-place update process, since a block (or even a whole picture) may be updated from more than one source. Here, it is desirable for the threshold to be more selective than in conventional update process so as to avoid additional artifacts caused by the multiple updates.

In situations involving a threshold or weighting function, the update process becomes:

$$s[x,2k] := s[x,2k] - wT(s[x+m_{U1}, 2k-1]), \quad \text{Eq.-17}$$

where T(s) is any function introducing a saturation on the maximum value of the signal s.

Constraints on the Update Process

As previously discussed, embodiments have been described that remove the need for having residual buffers on the decoder side. However, each on of those embodiments typically introduces some constraints on the encoding order (of the pictures or of the blocks). In some environments, it may be desirable to simplify not only the decoding process, but also the encoding one.

In an embodiment, the picture coding order introduced by the split update process removed the need for residual buffers on the decoder side, but not on the encoder one. Thus, in order to remove the need for residual picture buffers on the encoder side, additional constraints should be placed on the MCTF structure. In an embodiment, constraining the update to be limited to a single picture removes the need for residual buffers on the encoder side, which is described in more detail below.

The block coding orders introduced by the local update process results in the encoder scanning the picture twice, once in a reverse scan order for executing the prediction and updates processes, and once in a normal scan order for the coding of the blocks themselves. Contrary to what this may imply, twice scanning the picture is not an increase in complexity as compared to a conventional picture based update, where the picture is also scanned more than once. However, for some applications it may be interesting to also have an encoder capable of scanning each block only once. In an embodiment, such a configuration is possible if a reference pixel can be updated only by a single source, which is discussed further below.

Picture Coding Order

Figure 14:
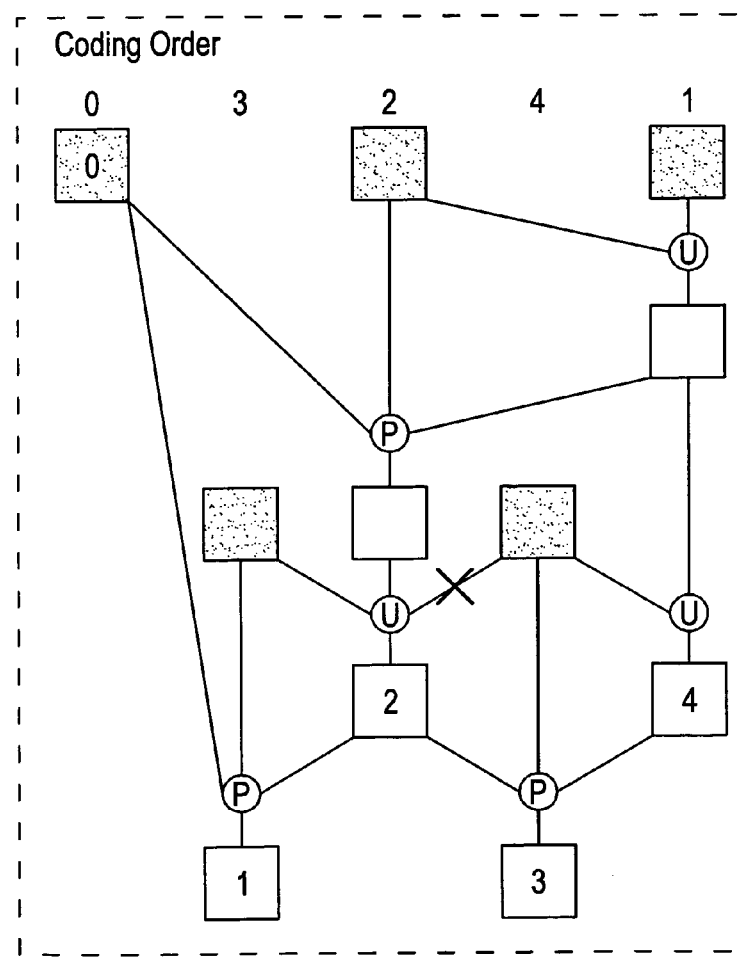
FIG. 14 depicts an exemplary 3/3 MCTF process where backwards updates are not permissible.

The constraints on the coding order of a picture may be removed if a picture can be updated only from a single source. An embodiment suitable for such an implementation is depicted in FIG. 14, which is referred to as 3/3 MCTF. Here, a backwards update is not permissible, and the encoding and decoding processes are described as:

Picture 0 is encoded
The picture 1 is predicted from picture 0 and picture 2
The picture 1 is used to update picture 2
The picture 3 is predicted by updated picture 2 and 4
The picture 3 is used to update picture 4
Picture 2 is predicted by picture 0 and updated picture 4
Picture 2 is used to update picture 4 once more
Picture 4 is encoded
Picture 2 is encoded
Picture 1 is encoded
Picture 3 is encoded
for the encoder, and in the reverse order:
Picture 0, 4, 2 are received
Picture 2 is used to update picture 4
Picture 2 is predicted from picture 0 and 4
Picture 1 is received
The picture 1 is used to update picture 2
The picture 1 is predicted from picture 0 and picture 2
Picture 3 is received
The picture 3 is used to update pictures 4
The picture 3 is finally predicted by pictures 2 and 4 for the decoder.

By disallowing an update from multiple sources, the complexity of the decoder is also reduced, since at most one update process will be called per input picture.

By introducing this constraint, however, some impact on the compression efficiency for some video sequences may be experienced. For example, sequences with large camera motion and high temporal correlation may experience a loss of compression efficiency of about 2%. However, this is still less than the loss of compression efficiency from the complete removal of the update process, which incurs compression efficiency losses of about 10-15%.

Block Processing Order Revisited

To remove the constraint on the block processing order, a pixel should be updated from only a single source. Additionally, care should be taken if a pixel is used in the prediction of two different blocks.

For example, and with reference to FIG. 13, C1 is used to update the whole R1 block, while C2 updates only the part of the R2 block that is not overlapping with R1. In this embodiment, once a pixel has been updated it cannot be updated a second time. Using this constraint, the decoder and the encoder maintain an additional map of the updated pixel, where the map keeps trace of the updated pixels. To reduce the complexity of this embodiment, the pixel based map may be simplified and approximated by a block (or sub-block) based map. For example, if it is assumed that the motion compensation process is based on 16×16 block, it would be sufficient to keep a map for 4×4 blocks.

To avoid a mismatch between the encoder and the decoder, the original picture should be used for the prediction process, even if a block as already been updated.

In an exemplary embodiment, update/prediction process pseudo code for integer pixel accuracy and direct inversion may be modified as follows:

For each pixel at position x in the current block do:
    Compute the position of the reference pixel y=floor(x+ MV$_P$(X)).
    If the reference pixel at position y is not marked as updated
        Compute the update motion MV$_U$(y)
        Update the pixel at position y using MV$_U$(y)
        Mark the pixel at position y as updated.
For each pixel at position x in the current block do:
    Predict pixel at position x using MV$_P$(x).
For the EDU algorithm, the update equation may be modified as follows:

$$s[y, 2k] := s[y, 2k] - \beta\left(\sum_{x \in B} w'_{x,y} s[y, 2k+1]\right), \quad \text{Eq.-18}$$

were $w'_{x,y}$ is equal to $w_{x,y}$ if M(y)=0, and zero if M(y)=1. M(y) is initially set to 0 for all y. Then, after each block, M(y) is set to 1 for all y for which $w_{x,y}$ is not equal to zero.

Thus, using the exemplary embodiment of FIG. 13, the encoder process would be:

Predict C1 using R1
Update the whole R1 block using C1
Predict C2 using the original R2 block (for the overlapped region with R2, do not use the updated pixels)
Update the parts of R2 that are not overlapping with R1 using C2.

The decoder would process the block in the same order, but in the reverse order to the predictions and the updates, that is:
Update the whole R1 block using C1
Predict C1 using R1
Update the part of R2 that are not overlapping with R1 using C2
Predict C2 using R2 (in this case no special care must be taken, because R2 corresponds to the original image).

System

Figure 15:
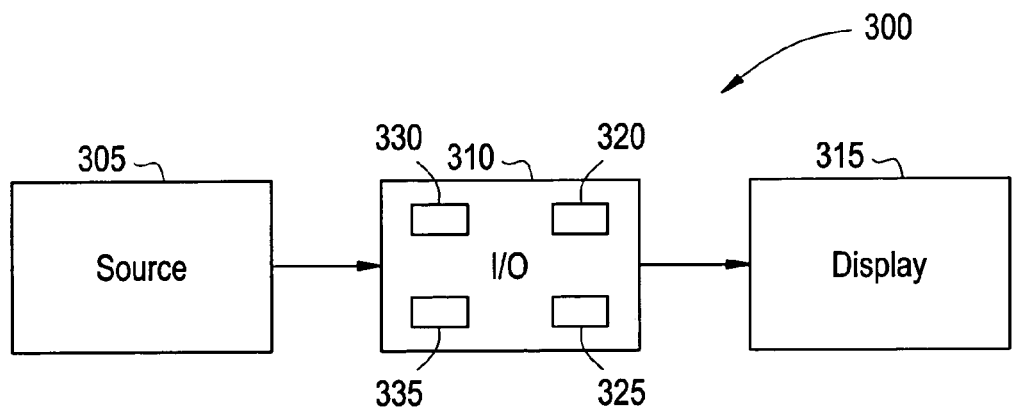
FIG. 15 depicts a system for use in accordance with an embodiment of the invention.

As depicted in FIG. 15, an embodiment of the invention includes a system 300 in which temporal decomposition and reconstruction of an input video signal may be practiced in accordance with an embodiment of the invention by implementing the method illustrated by FIGS. 5 and 12, which uses a prediction process and an update process in the framework of motion compensated temporal filtering (MCTF), the motion information used for the update process being derived from the motion information used for the prediction process, the method employing a block based video codec composed of an encoder and a decoder. By way of example, the system 300 may represent a television, a set-top box, a desktop, laptop or palmtop computer, a personal digital assistant (PDA), a video/image storage device such as a video cassette recorder (VCR), a digital video recorder (DVR), or a personal video recorder device available from TiVo Inc., for example, as well as portions or combinations of these and other devices. In an exemplary embodiment, system 300 includes one or more video signal sources 305, one or more input/output (I/O) devices 310, and one or more display devices 315. In an embodiment, I/O device 310 includes a processor 320, a storage medium 325, an encoder 330, and a decoder 335. I/O device 310 may consist of an assembly of separate devices integrated into one, or may consist of discrete devices that communicate over a communication medium, such as a communication bus, a communication network (hardwire, optical or wireless), one or more internal connections of a circuit, circuit card or other device, as well as portions and combinations of these and other communication media.

An exemplary video signal source 305 may include or represent a television receiver, a VCR or any other video/image storage device, one or more network connections for receiving video from a server or servers over, for example, a global computer communications network such as the Internet, a wide area network, a metropolitan area network, a local area network, a terrestrial broadcast system, a cable network, a satellite network, a wireless network, a telephone network, or any portion or combination of such networks.

In an exemplary embodiment, the input data from video signal source 305 is processed in accordance with an embodiment of the invention using computer readable code stored in storage medium 325 and executed by processor 320 for generating output video/images supplied to the display device 315.

An embodiment of the invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to decompose and reconstruct an input video signal that uses a prediction process and an update process in the framework of motion compensated temporal filtering (MCTF), wherein in response to the update and prediction processes being based on N reference pictures, with N being greater than one, the update process is split into N update processes using a single reference picture as an input picture, and the update process is executed on a received picture with respect to each input picture.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for temporal decomposition and reconstruction of an input video signal that uses a prediction process and an update process in a framework of motion compensated temporal filtering (MCTF), motion information used for the update process being derived from motion information used for the prediction process, the method employing a block based video codec composed of an encoder and a decoder, the method comprising:
   receiving a first picture, a second picture, and a third picture in a group of pictures from the input video signal;
   performing the prediction process on the second picture utilizing the first picture and the third picture;
   receiving, after performing the prediction process, a fourth picture in the group of pictures;
   performing, after receiving the fourth picture, a first part of the update process on the second picture utilizing the fourth picture;
   receiving, after performing the first part of the update process, a fifth picture in the group of pictures; and
   performing, after receiving the fifth picture, a second part of the update process on the second picture utilizing the second picture.

2. The method of claim 1, the method further comprising:
   performing a first part of the update process on the third picture utilizing the second picture; and
   performing, after receiving the fifth picture, a second part of the update process on the third picture utilizing the fifth picture.

3. The method of claim 2, the method further comprising:
   performing the prediction process on the fifth picture utilizing the second picture that was updated and the third picture that was updated.

4. The method of claim 1, the method further comprising:
performing, upon receipt of the fourth picture, the prediction process on the fourth picture utilizing the first picture and the second picture that was updated by the first part of the update process.

5. The method of claim 4, wherein the group of pictures are identifiable by consecutive index numbers.

6. The method of claim 5, wherein the first picture, the second picture, and the third picture comprise even index numbers of the consecutive index numbers and wherein the fourth picture and the fifth picture comprise odd index number of the consecutive index numbers.

7. The method of claim 1, wherein:
the update and prediction processes are executed on a block basis, such that for each block of a currently decoded picture the processes within the decoder are executed according to the following:
update a reference block using a current block, thereby defining a local update process; and
predict the current block using an updated reference block.

8. The method of claim 7, further comprising:
inverting a block scanning order between the encoder and the decoder.

9. The method of claim 7, further comprising:
using sub-pixel accuracy for the prediction of the current block; and
in response thereto, rounding a motion vector to a next full pixel precision for a computation of the update process.

10. The method of claim 7, further comprising:
using sub-pixel accuracy for the prediction of the current block; and
in response thereto, shifting a motion vector to be aligned on a pixel of the updated reference block.

11. The method of claim 7, further comprising:
using sub-pixel accuracy for the prediction of the current block; and
in response to two blocks using a same pixel for the prediction process, updating the pixel only for a first time the pixel is used.

12. The method of claim 11, wherein the processes for a decoded picture are in accordance with the following:
use the current block to update all pixels of the reference block that have not yet been updated; and
use the updated reference block to predict the current block.

13. The method of claim 7, further comprising:
using sub-pixel accuracy for motion prediction of the current block, and using a sub-block of pixels having a size from 2×2 pixels to a full size of the current block used for motion prediction, wherein:
a sub-block of pixels may be updated only by a single reference sub-block; and
in response to two blocks using a same sub-block of pixels for the prediction process, updating the sub-block of pixels only a first time the sub-block of pixels are used.

14. The method of claim 13, wherein the processes for the decoded picture are executed according to the following:
use the current block to update all pixels of a reference block not belonging to a sub-block having already been updated; and
use the updated reference block to predict the current block.

15. A device for temporal decomposition and reconstruction of an input video signal that uses a prediction process and an update process in a framework of motion compensated temporal filtering (MCTF), motion information used for the update process being derived from motion information used for the prediction process, said device employing a block based video codec comprising an encoder, a decoder, and a non-transitory storage medium, readable by a processing circuit, storing instructions for execution by the processing circuit for:
receiving a first picture, a second picture, and a third picture in a group of pictures from the input video signal;
performing the prediction process on the second picture utilizing the first picture and the third picture;
receiving, after performing the prediction process, a fourth picture in the group of pictures;
performing, after receiving the fourth picture, a first part of the update process on the second picture utilizing the fourth picture;
receiving, after performing the first part of the update process, a fifth picture in the group of pictures; and
performing, after receiving the fifth picture, a second part of the update process on the second picture utilizing the second picture.

16. A device for temporal decomposition and reconstruction of an input video signal that uses a prediction process and an update process in a framework of motion compensated temporal filtering (MCTF), motion information used for the update process being derived from motion information used for the prediction process, said device employing a block based video codec comprising an encoder and a decoder configured to facilitate:
receiving a first picture, a second picture, and a third picture in a group of pictures from the input video signal;
performing the prediction process on the second picture utilizing the first picture and the third picture;
receiving, after performing the prediction process, a fourth picture in the group of pictures;
performing, after receiving the fourth picture, a first part of the update process on the second picture utilizing the fourth picture;
receiving, after performing the first part of the update process, a fifth picture in the group of pictures; and
performing, after receiving the fifth picture, a second part of the update process on the second picture utilizing the second picture.

\* \* \* \* \*